M. YOSHIKAWA.
FLYTRAP.
APPLICATION FILED AUG. 2, 1919.

1,326,818.

Patented Dec. 30, 1919.
2 SHEETS—SHEET 1.

WITNESS:
K. A. Thomas

INVENTOR.
BY Masáo Yoshikawa
Victor J. Evans
ATTORNEY.

M. YOSHIKAWA.
FLYTRAP.
APPLICATION FILED AUG. 2, 1919.

1,326,818.

Patented Dec. 30, 1919.
2 SHEETS—SHEET 2.

WITNESS:
W. A. Thomas

INVENTOR.
BY Masao Yoshikawa
Victor J. Evans
ATTORNEY.

UNITED STATES PATENT OFFICE.

MASAO YOSHIKAWA, OF COLLEGE PARK, MARYLAND.

FLYTRAP.

1,326,818.  Specification of Letters Patent.  Patented Dec. 30, 1919.

Application filed August 2, 1919. Serial No. 314,912.

*To all whom it may concern:*

Be it known that I, MASAO YOSHIKAWA, a subject of the Emperor of Japan, residing at College Park, in the county of Prince Georges and State of Maryland, have invented new and useful Improvements in Flytraps, of which the following is a specification.

This invention relates to insect traps, particularly to mechanically driven devices for catching flies, and has for its object the provision of a trap including a clockwork driven endless belt coated with some suitable syrup or other bait to attract flies and movable into a hood which communicates with a cage member into which the flies will pass and be caught.

An important object is the provision of a trap of this character in which the hood member is formed of transparent material so that the flies will not be alarmed when carried thereinto by the moving belt, this hood member communicating with a space which is comparatively dark except for an opening which leads to the cage member, the idea being that the flies upon seeing the dark space ahead will become frightened, leave the belt, and fly toward the light, and consequently be caught in the cage member.

An additional object is the provision of a device of this character which will be simple and inexpensive in manufacture, highly efficient in use, continuous and positive in operation, durable in service, and a general improvement in the art.

With the above and other objects and advantages in view, the invention consists in the details of construction to be hereinafter more fully described and claimed, and illustrated in the accompanying drawings in which—

Figure 1:
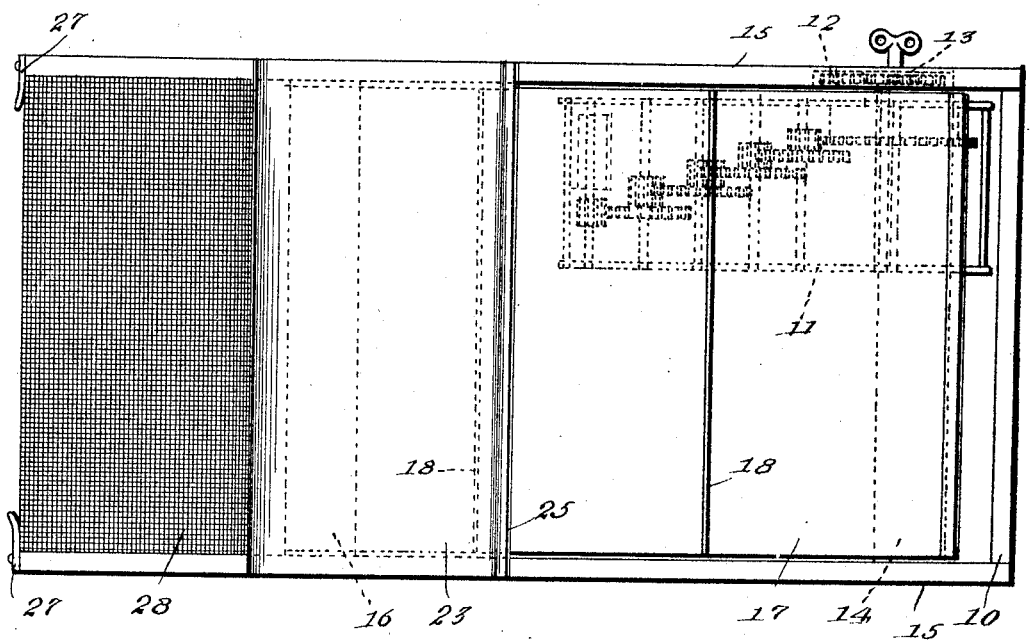
Figure 1 is a plan view of a trap constructed in accordance with my invention.
Figure 2:
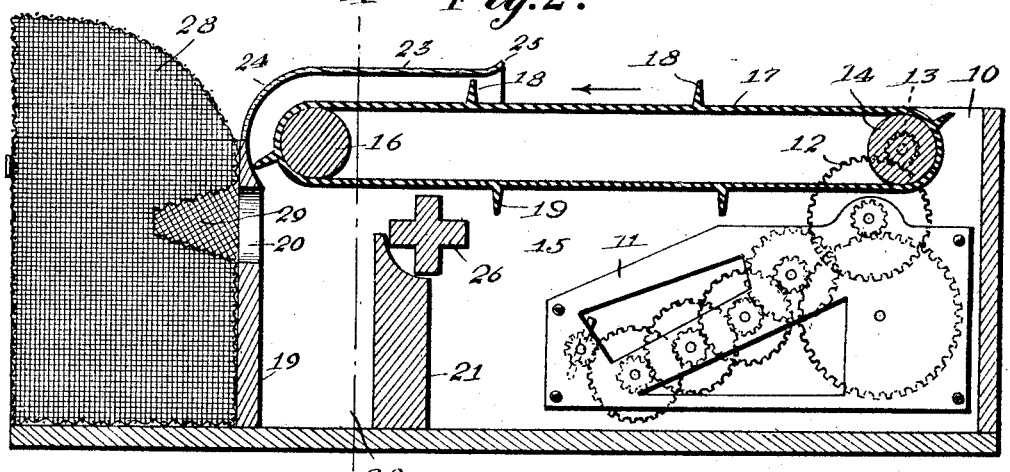
Fig. 2 is a central longitudinal sectional view.
Figure 3:
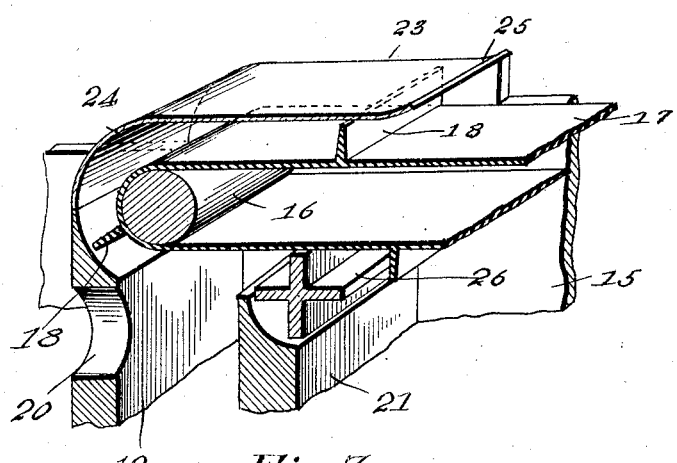
Fig. 3 is a perspective view of the hood member and its associated parts, parts being broken away and in section.
Figure 4:
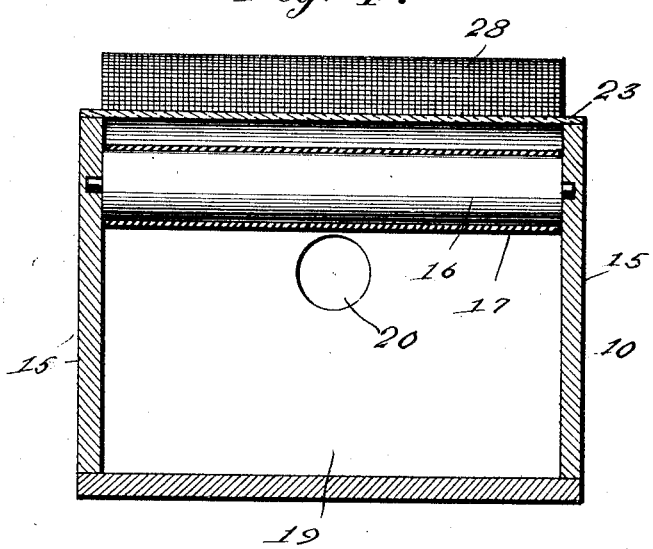
Fig. 4 is a cross sectional view on the line 4—4 of Fig. 2, looking toward the cage member.

Referring more particularly to the drawings, the numeral 10 designates a rectangular casing which is open at its top and at one end. Secured within this casing is a clockwork mechanism 11, the ultimate gear 12 of which meshes with a pinion 13 carried by a roller 14 journaled transversely between the sides 15 of the casing. A second roller 16 is journaled between the sides 15 and an endless belt 17 is trained about these two rollers. This belt is formed preferably of rubber and is adapted to have placed thereon syrup or any substance adapted to attract flies. The belt 17 has formed thereon at intervals, transverse ribs 18, for a purpose to be described.

Extending transversely between the sides 15 of the casing at a point spaced from the open end thereof, is a partition 19 having a circular opening 20 formed therein. A second transverse partition 21 is disposed a slight distance from the partition 19 and defines therewith a compartment 22. Secured upon the casing and extending transversely thereof is a hood member 23 formed of glass or other transparent material and which is curved, as shown at 24, in concentric relation to the roller 16 and the end of this curved portion is disposed upon the upper edge of the partition 19. The other end of the hood is curved upwardly, as shown at 25, whereby to provide a flaring entrance opening. The distance of the hood 23 from the belt and from the roller 16 is equal to the height of the rib 18 formed on the belt, for a purpose to be described.

Journaled transversely of the casing at the upper end of the partition 21 is a rotary member 26 which is cross shaped in cross section and which is in the nature of a turnstile. The arms of this member 26 project into the path of travel of the ribs 18, for a purpose to be hereinafter described.

Disposed at the open end of the casing 10 and held in position by suitable clips 27, is a cage 28 having a portion removable and provided in one side with an inwardly extending conical entrance member 29 which registers with the opening 20 in the partition 19.

The operation of the device is as follows:

The belt 17 is smeared with some suitable bait and the clockwork 11 is set in operation whereupon the belt 17 will be caused to move in the direction of the arrow. Flies will of course alight upon the bait and will be carried thereby into the hood 23 which being transparent will not alarm them as they approach it. During the course of travel of the belt the ribs 18 will enter the flaring entrance opening 25 of the hood and prevent the flies from escaping back out of the hood in the event that they should become frightened. As the flies are carried by the belt entirely through the hood they will be alarmed as they approach the compartment 22 which is naturally comparatively dark and they will fly from the belt into this compartment 22. As the only light spot is the opening 20 the flies will naturally pass thereinto and thence through the conical entrance member 29 into the cage 28 where they will be held imprisoned. When the cage is full or it is desired to destroy the flies the operator may release the clips 27 and remove the cage, after which the flies may be killed by pouring boiling water over them. As a portion of the cage is of course removable the dead flies may be readily removed. The provision of the member 26 in the casing is considered important as it prevents flies in the compartment 22 from escaping beneath the belt as it will be apparent that any one of the arms of this member 26 will almost contact with the lower strip of the belt and form an effective closure. During the travel of the belt the successive ribs 18 will engage the arms of the member 26 and the passage of each rib will rotate the member 26 a quarter turn so as to permit travel of the belt while still not leaving any opening through which the flies may escape.

From the foregoing description and a study of the drawings it will be apparent that I have thus provided a simply constructed and continuously operating fly catcher which will need scarcely any attention other than winding the spring of the clockwork, which will be highly efficient and positive in its catching action, and which will fully perform all the functions for which it is designed.

While I have shown and described the preferred embodiment of my invention it is of course to be understood that I reserve the right to make such changes in the form, construction, and arrangement of parts as will not depart from the spirit of the invention or the scope of the subjoined claims.

Having thus described my invention, I claim:—

1. A fly trap comprising a casing, a traveling bait carrying belt therein, means for moving said belt, a transverse partition within said casing having a hole therein, a hood member arranged transversely of said casing in spaced relation to said belt and having one end engaging upon said partition, a second partition spaced from said first named partition, means for closing the space between the top of said second named partition and the lower stretch of said belt, and a cage member disposed within said casing and having an entrance member registering with said hole.

2. A fly trap comprising a casing open at its top and at one end, a pair of rollers journaled transversely within the upper portion of said casing, an endless belt trained about said rollers and having transverse ribs thereon, means for driving said belt, a partition extending across said casing at a point spaced from the open end thereof and provided with a hole, a hood member arranged transversely of the casing in spaced parallel relation to said belt and having a curved portion seating upon said partition and concentric with the adjacent roller, said ribs upon entering said hood member forming a closure therefor, a second partition spaced from said first named partition and defining therewith a compartment communicating with said hole, a rotary member journaled transversley within said casing at the upper portion of said second named partition and having arms engaged by said ribs to permit passage of the ribs while retaining a closure for the space between the upper edge of said second named partition and the lower stretch of the belt, and a cage member disposed at the open end of said casing and having an entrance portion registering with said hole.

In testimony whereof I affix my signature.

MASAO YOSHIKAWA.